United States Patent
Yoon et al.

(10) Patent No.: US 9,058,521 B2
(45) Date of Patent: Jun. 16, 2015

(54) MOBILE ROBOT AND SIMULTANEOUS LOCALIZATION AND MAP BUILDING METHOD THEREOF

(75) Inventors: Suk June Yoon, Seoul (KR); Kyung Shik Roh, Seongnam-si (KR); Seung Yong Hyung, Yongin-si (KR); Hyo Seok Hwang, Seoul (KR); Sung Hwan Ahn, Anyang-Si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 325 days.

(21) Appl. No.: 13/218,844

(22) Filed: Aug. 26, 2011

(65) Prior Publication Data
US 2012/0106828 A1 May 3, 2012

(30) Foreign Application Priority Data

Nov. 3, 2010 (KR) .......................... 10-2010-0108561

(51) Int. Cl.
*G06K 9/00* (2006.01)
*G05D 1/02* (2006.01)
*G06T 7/00* (2006.01)

(52) U.S. Cl.
CPC .......... *G06K 9/00664* (2013.01); *G05D 1/0274* (2013.01); *G06T 7/0048* (2013.01); *G05D 2201/0207* (2013.01); *G06T 2207/10016* (2013.01); *G06T 2207/20076* (2013.01); *G06T 2207/30244* (2013.01); *G06T 2207/30252* (2013.01); *G05D 1/0253* (2013.01)

(58) Field of Classification Search
None
See application file for complete search history.

(56) References Cited

U.S. PATENT DOCUMENTS

| 7,877,007 | B2* | 1/2011 | Yoon et al. | 396/325 |
| 8,331,652 | B2* | 12/2012 | Yoon et al. | 382/153 |
| 8,498,472 | B2* | 7/2013 | Yoon et al. | 382/154 |
| 8,498,488 | B2* | 7/2013 | Yoon et al. | 382/207 |
| 2008/0232678 | A1* | 9/2008 | Yoon et al. | 382/153 |
| 2009/0080697 | A1* | 3/2009 | Kishikawa et al. | 382/103 |
| 2009/0154769 | A1* | 6/2009 | Yoon et al. | 382/103 |
| 2009/0276092 | A1* | 11/2009 | Yoon et al. | 700/245 |
| 2010/0040279 | A1* | 2/2010 | Yoon et al. | 382/153 |
| 2012/0106828 | A1* | 5/2012 | Yoon et al. | 382/153 |

OTHER PUBLICATIONS

Karlsson et al. (Apr. 2005) "The vSLAM algorithm for robust localization and mapping." Proc. 2005 IEEE Int'l Conf. on Robotics and Automation, pp. 24-29.*

(Continued)

*Primary Examiner* — Barry Drennan
(74) *Attorney, Agent, or Firm* — Harness, Dickey & Pierce, P.L.C.

(57) ABSTRACT

A simultaneous localization and map building method of a mobile robot including an omni-directional camera. The method includes acquiring an omni-directional image from the omni-directional camera, dividing the obtained omni-directional image into upper and lower images according to a preset reference to generate a first image, which is the lower image, and a second image, which is the upper image, extracting feature points from the first image and calculating visual odometry information calculating visual odometry information to track locations of the extracted feature points based on a location of the omni-directional camera, and performing localization and map building of the mobile robot using the calculated visual odometry information and the second image as an input of an extended Kalman filter.

14 Claims, 9 Drawing Sheets

(56) References Cited

OTHER PUBLICATIONS

Campbell et al. (2005) "A robust visual odometry and precipice detection system using consumer-grade monocular vision." Proc. 2005 IEEE Int'l Conf. on Robotics and Automation, pp. 3421-3427.*

Yoon et al. (2006) "Global localization of mobile robot using omni-directional image correlation." LNCS vol. 4319, pp. 433-441.*

Yoon et al. (Sep. 2007) "Efficient navigation algorithm using 1d panoramic images." Proc. $3^{rd}$ IEEE Conf. on Automation Science and Engineering, pp. 536-541.*

Rituerto et al. (Aug. 2010) "Visual SLAM with an omnidirectional camera." Proc. 2010 Int'l Conf. on Pattern Recognition, pp. 348-351.*

Iida, F. (2003) "Biologically inspired visual odometer for navigation of a flying robot." Robotics and Autonomous Systems, vol. 44 pp. 201-208.*

Scaramuzza et al. (Oct. 2008) "Appearance guided monocular omnidirectional visual odometry for outdoor ground vehicles." IEEE Trans. on Robotics, vol. 24 No. 5, pp. 1015-1026.*

* cited by examiner

MOBILE ROBOT AND SIMULTANEOUS LOCALIZATION AND MAP BUILDING METHOD THEREOF

CROSS-REFERENCE TO RELATED APPLICATIONS

This application claims the benefit of Korean Patent Application No. 2010-0108561, filed on Nov. 3, 2010 in the Korean Intellectual Property Office, the disclosure of which is incorporated herein by reference.

BACKGROUND

1. Field

Embodiments relate to a mobile robot and a localization and map building method thereof, and more particularly, to a mobile robot to simultaneously perform localization and map building using omni-directional images and a simultaneous localization and map building method of the mobile robot.

2. Description of the Related Art

For navigation of a mobile robot in an environment having obstacles, the robot needs to track its location and build a map for the surrounding environment. This is because path planning of the robot, manipulation of an object, or communication with people may be performed using the map.

For navigation in an unknown environment, a robot should build a map while tracking a location thereof. However, since a robot basically tracks a location thereof and builds a map using infrared sensor data containing noise, there is a difficulty in calculation of the location.

Map building models environments by observing natural or artificial landmarks based on the sensor data, and through this modeling, the robot sets a path thereof. Meanwhile, in order to perform modeling of a complicated environment, location tracking should be ensured and thus a reliable map may be built.

Location tracking refers to determining an absolute location of a robot within a work environment using sensor information and natural landmarks. Errors may occur for various reasons (e.g. sliding between robot wheels and the ground, variation in the radius of robot wheels) while a robot moves. That is, as the robot moves, an error in a location of the robot occurs. Accordingly, a method to correct for the error is required.

SUMMARY

Therefore, it is an aspect of an embodiment to provide a mobile robot and a simultaneous localization and map building method thereof, which divide a captured omni-directional image into upper and lower images based on a preset reference, calculate odometry information using the lower image, and perform simultaneous localization and map building using the odometry information.

Additional aspects of embodiments will be set forth in part in the description which follows and, in part, will be obvious from the description, or may be learned by practice of the embodiments.

In accordance with an aspect of an embodiment, a simultaneous localization and map building method of a mobile robot including an omni-directional camera, includes acquiring an omni-directional image from the omni-directional camera, dividing the obtained omni-directional image into upper and lower images according to a preset reference to generate a first image, which is the lower image, and a second image, which is the upper image, extracting feature points from the first image and calculating visual odometry information calculating visual odometry information to track locations of the extracted feature points based on a location of the omni-directional camera, and performing localization and map building of the mobile robot using the calculated visual odometry information and the second image as an input of an extended Kalman filter.

The omni-directional camera may be installed in parallel to a horizontal plane at a front surface of the mobile robot.

The calculating visual odometry information may include extracting feature points from the first image, calculating locations of the extracted feature points based on a current location of the omni-directional camera, calculating a rotation vector and a translation vector according to movement of the omni-directional camera, and tracking locations of the feature points by calculating locations of the extracted feature points based on a moved location of the omni-directional camera according to the calculated rotation vector and translation vector.

The extracting feature points from the first image may include extracting new feature points from an area of the first image excluding an area in which the location-tracked feature points are present.

The preset reference may be a height of the omni-directional camera based on the ground.

The performing localization and map building of the mobile robot may include extracting feature points from the second image, predicting locations of the robot and the feature points using the calculated visual odometry information as a traveling input, and updating the locations of the robot and the feature points by updating the locations of the robot and the feature points based on the second image.

In accordance with another aspect of an embodiment, a mobile robot including an omni-directional camera includes an image processor to divide an omni-directional image captured through the omni-directional camera into upper and lower images according to a preset reference and generate a first image, which is the lower image, and a second image, which is the upper image, a visual odometry information calculator to extract feature points from the first image and track locations of the extracted feature points based on the omni-directional camera, and a simultaneous location and map building (SLAM) executor to perform localization and map building of the mobile robot using visual odometry information calculated by the visual odometry information calculator and the second image as an input of an extended Kalman filter.

The omni-directional camera may be installed in parallel to a horizontal plane at a front surface of the mobile robot.

The visual odometry calculator may extract feature points from the first image generated from the image processor, calculate locations of the extracted feature points based on a current location of the omni-directional camera, calculate a rotation vector and a translation vector according to movement of the omni-directional camera, and tracks the locations of the feature points by recalculating the locations of the extracted feature points based on a moved location of the omni-directional camera according to the calculated rotation vector and translation vector.

The visual odometry information calculator may extract new feature points from an area of the first image excluding an area in which the location-tracked feature points are present.

The image processor may divide the captured omni-directional image according to the preset reference which is a height of the omni-directional camera based on the ground.

The SLAM executor may extract feature points from the second image, predict locations of the mobile robot and the feature points using the calculated visual odometry information as a traveling input, and update the locations of the mobile robot and the feature points by updating the locations of the robot and the feature points based on the second image.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout.

Figure 1:
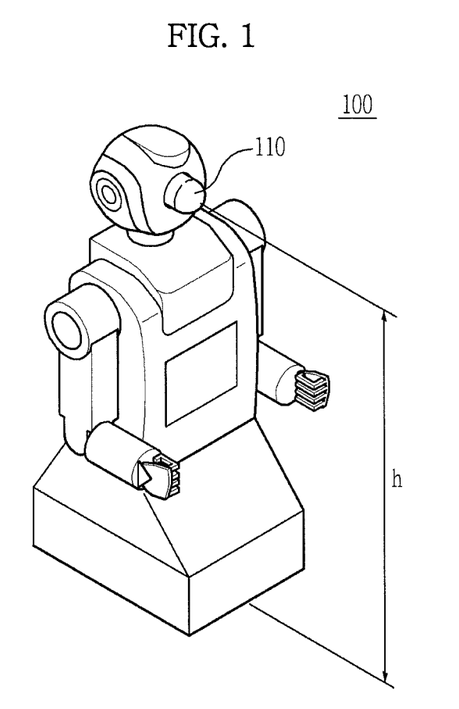
FIG. 1 is a diagram illustrating an outer appearance of a mobile robot according to an embodiment.
Figure 2:
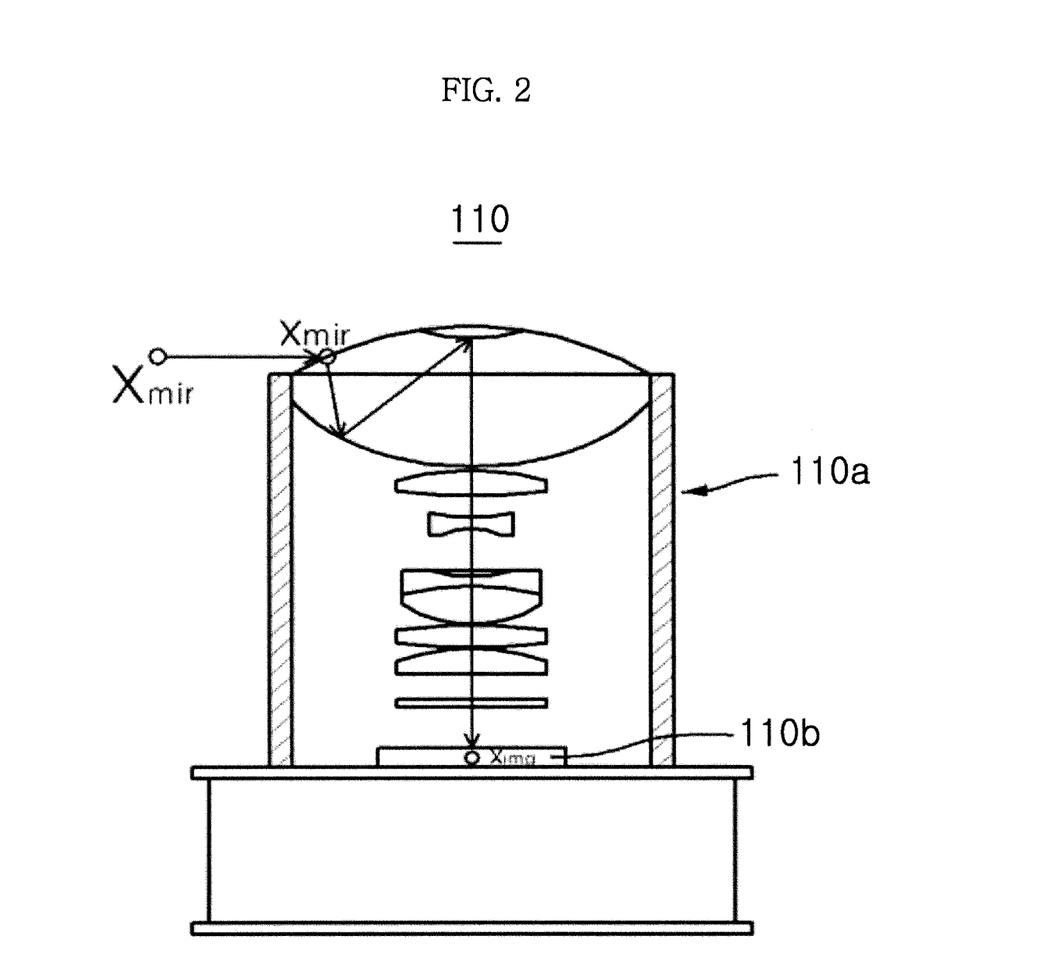
FIG. 2 is a cross-sectional diagram of an omni-directional camera installed in the moving robot shown in FIG. 1.

FIG. 1 is a diagram illustrating an outer appearance of a moving robot according to an embodiment, and FIG. 2 is a cross-sectional diagram of an omni-directional camera installed in the moving robot shown in FIG. 1.

Conventionally, localization and map building of a mobile robot has been performed through images photographed by an omni-directional camera installed at the upper side of the mobile robot. The images photographed by the omni-directional camera include a wide range of information and therefore may be efficiently used for obstacle detection and avoidance.

However, the wide range of information is likely to include moving objects, thereby causing errors in localization and map building performed by assuming a static environment.

Moreover, since a conventional mobile robot performs localization and map building using odometry information of robot wheels, if the wheels slip or spin out according to the state of a bottom surface, incorrect odometry information may be obtained and accurate localization of the mobile robot may not be performed.

According to an embodiment to solve the above-mentioned problems, an omni-directional camera 110 is installed at the front surface of a mobile robot 100 to be parallel to a horizontal plane as shown in FIG. 1.

The omni-directional camera 110 enables the mobile robot 100 to capture a bottom surface image and accurately estimate a distance traveled by the mobile robot 100 using the captured bottom surface image. Information as to the estimated traveling distance of the mobile robot 100 is visual odometry information, which will be described in detail later.

Referring to FIG. 2, the omni-directional camera 110 includes an omni-directional lens 110a and a Charge Coupled Device (CCD) 110b. A curved mirror is installed at the front surface of the omni-directional camera to obtain a 360° image around the omni-directional camera. A point $X_{mir}$ in an arbitrary space is reflected from a point $X_{mir}$ of a curved mirror surface and is focused on the CCD device 110b, thereby appeasing as a point $X_{img}$ on an image. Since the point $X_{mir}$ is distributed in every direction, the omni-directional camera may obtain a 360° image.

Figure 3:
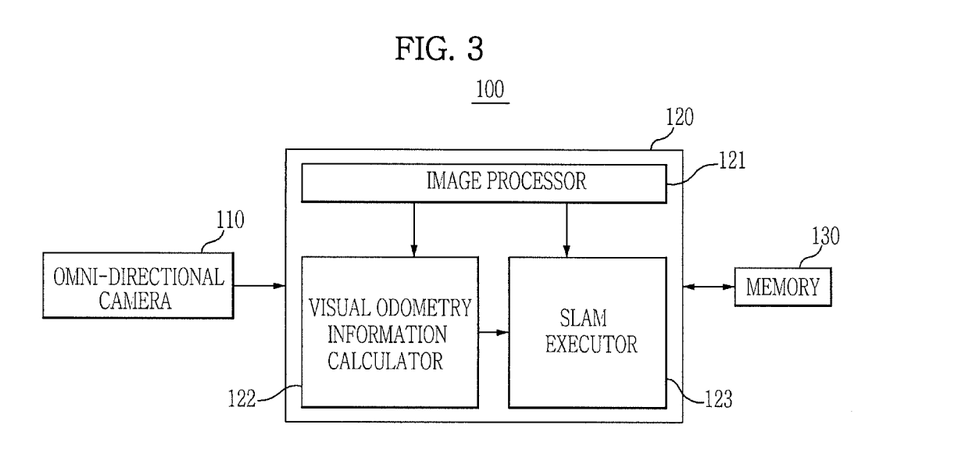
FIG. 3 is a control block diagram of a mobile robot according to an embodiment.

FIG. 3 is a control block diagram of a mobile robot according to an embodiment. The mobile robot includes an omni-directional camera 110, a controller 120, and a memory 130.

The controller 120 controls the overall operation of the mobile robot and includes an image processor 121, a visual odometry information calculator 122, and a simultaneous localization and map building (SLAM) executor 123.

The image processor 121 divides an omni-directional image captured through the omni-directional camera 110 into upper and lower images based on the height (h in FIG. 1) of the omni-directional camera 110 stored in the memory 130. The image processor 121 transmits a first image, which is the divided lower image, to the visual odometry information calculator 122 and transmits a second image, which is the divided upper image, to the SLAM executor 123.

The visual odometry information calculator 122 calculates odometry information using the first image received from the image processor 121 and transmits the calculated odometry information to the SLAM executor 123.

Meanwhile, the first image is a bottom image according to a traveling path of the mobile robot 100. The visual odometry information calculator 122 accurately calculates a traveling distance of the mobile robot 100 using the first image.

The SLAM executor 123 performs simultaneous localization and map building of the mobile robot 100 using the second image received from the image processor 121 and the calculated visual odometry information.

Specifically, the SLAM executor 123 extracts feature points from the second image, predicts the locations of the feature points and the mobile robot in real time, and updates the location of the mobile robot based on the second image. Such simultaneous localization and map building of the mobile robot 100 is implemented based on an Extended Kalman Filter (EKF).

Meanwhile, the omni-directional camera 110 captures a 360° image. The omni-directional image includes background, and objects, such as things or people, which have different brightness from the background. Since an edge between an object and background is darker than surrounding areas, it serves as a landmark recognized well by the mobile robot 100. Accordingly, such an edge is referred to as a feature point in the present embodiments.

Figure 4:
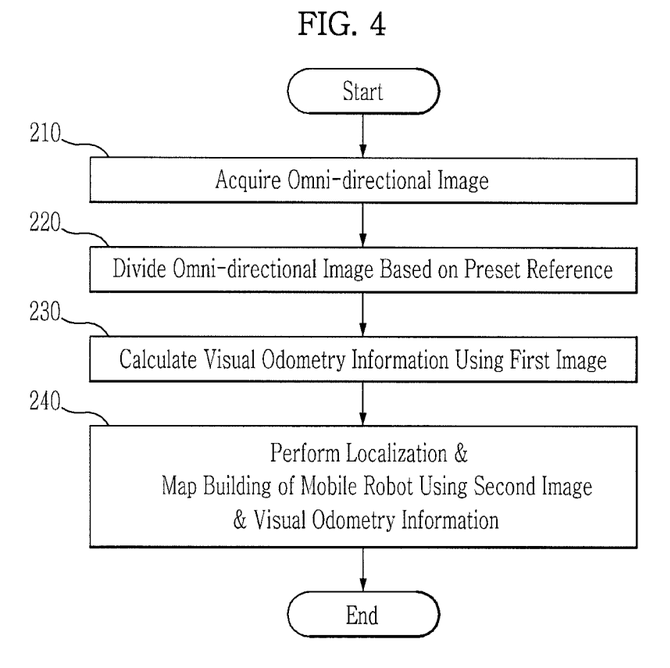
FIG. 4 is flowchart illustrating a simultaneous localization and map building method of a mobile robot according to another embodiment.

FIG. 4 is a flowchart illustrating a simultaneous localization and map building method of a mobile robot according to another embodiment.

If a mobile robot is placed at any location in space, the omni-directional camera 110 of the mobile robot photographs an omni-directional image in step 210. The omni-directional camera 110 periodically captures an omni-directional image while simultaneous localization and map building is performed and provides the captured image to the image processor 121.

The image processor 121 divides the obtained omni-directional image based on a preset reference in step 220.

Specifically, the image processor 121 divides the omni-directional image based on the height (h in FIG. 1) of the omni-directional camera 110 from the ground. The image processor 121 generates a first image, which is obtained by photographing a bottom surface as a lower image, and a second image as an upper image.

Figure 5:
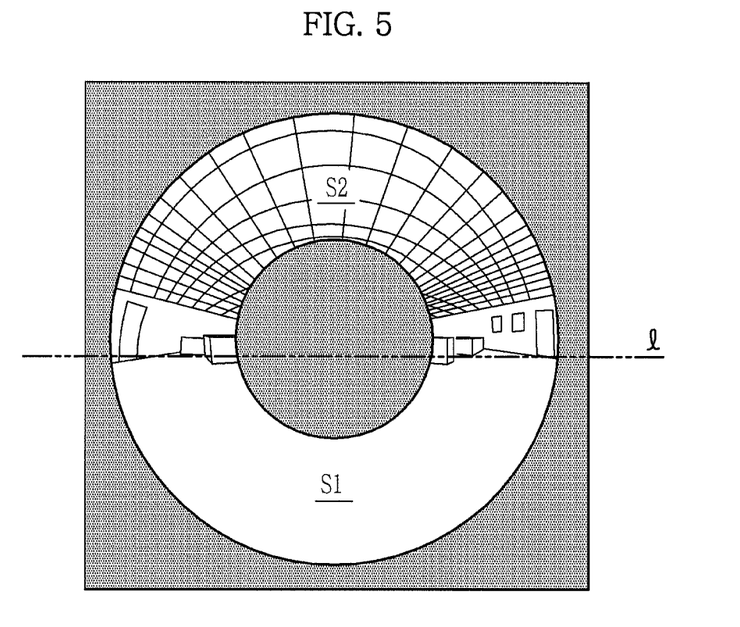
FIG. 5 is a diagram illustrating an example of an omni-directional image captured through an omni-directional camera installed in the mobile robot of FIG. 1.

FIG. 5 is a diagram illustrating an example of an omni-directional image captured through an omni-directional camera installed in the mobile robot of FIG. 1. As shown, a first image S1, which is a lower image, and a second image S2, which is an upper image, are generated by the image processor based on a preset reference I.

Referring back to FIG. 4, if the omni-directional image is divided in step 220, the image processor 121 provides the first image to the visual odometry information calculator 122. The visual odometry information calculator 122 extracts feature points from the bottom image of the first image and calculates visual odometry information to track the feature points in step 230.

The visual odometry information may prevent the mobile robot from failing to perform localization due to a difference between an actual traveling distance and a traveling distance of the mobile robot when wheels of the mobile robot slip or spin out.

Meanwhile, a method to calculate the visual odometry information will be described later with reference to FIG. 7.

If the visual odometry information is calculated in step 230, the SLAM executor 123 simultaneously performs localization and map building of the mobile robot using the second image generated from the SLAM executor 123 and the visual odometry information in step 240.

Figure 6:
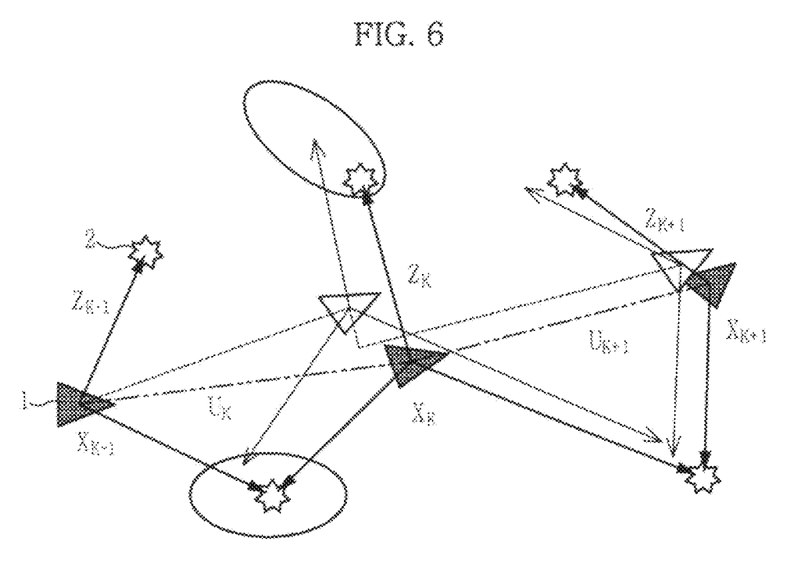
FIG. 6 is a diagram illustrating the concept of simultaneous localization and map building of a mobile robot in FIG. 4.

The concept of the simultaneous localization and map building of the mobile robot performed by the SLAM executor 123 is described in conjunction with FIG. 6.

Referring to FIG. 6, a location value $Z_{k-1}$ of a landmark 2 measured at a location $X_{k-1}$ by a mobile robot 1 has a measurement error. When the mobile robot 1 travels to a location $X_k$, a measurement value $Z_k$ of the landmark 2 at the location $X_k$ also has an error by a traveling input $U_k$. These errors may accumulate to the point that the location of the mobile robot 1 and the location of the landmark 2 may not be accurately measured. Simultaneous localization and map building proposed to prevent this phenomenon is a simultaneous update technique using a probabilistic approach to the location (co-ordinates) of the mobile robot 1 and the location of the landmark 2 when information as to a surrounding environment is not known.

The most widely used probabilistic approach is an Extended Kalman Filter (EKF). In the present embodiments, the simultaneous localization and map building based on EKF are performed.

The SLAM executor 123 predicts the location of the mobile robot using a traveling input of the mobile robot and updates the locations of the mobile robot and landmarks using sensor measurement values (e.g. a measurement value of an ultrasonic sensor or a laser sensor, an image of a camera, etc.).

Specifically, the SLAM executor 123 extracts feature points from the second image transmitted by the image processor 121 and calculate a location of the mobile robot and angles formed by the location of the mobile robot and the feature points in order to determine where the feature points are located in space. If the location of the mobile robot and the angles formed by the mobile robot and the feature points are calculated, the SLAM executor 123 calculates 3-dimensional coordinates (X, Y, Z) of the feature points in space.

If the coordinates of the feature points are calculated, the SLAM executor 123 constructs a state vector X and applies the state vector X to a system function of EKF.

$$X = \begin{bmatrix} x \\ y \\ \phi \\ X_1 \\ Y_1 \\ Z_1 \\ X_2 \\ \vdots \end{bmatrix}$$ [Equation 1]

Equation 1 indicates the state vector X applied to the system function of the EKF and is constructed by a location (x,y) of a mobile robot, angles ø between the mobile robot and feature points, and coordinates $(X_i, Y_i, Z_i)$ of the feature points in space.

The system function of the EKF is indicated in the following Equation 2.

$$\hat{X}_K = f(X_{K-1}, U_K + Q_v)$$ [Equation 2]

The system function is used to perform motion predication to predict the locations of the mobile robot and feature points at t=k in a state vector $X_{k-1}$, at t=k−1 by using visual odometry information $U_k$ as traveling input. Meanwhile, an error covariance $Q_v$ is considered because the traveling input of the mobile robot or measurement values of the locations of the mobile robot and feature points have errors.

If the location of the mobile robot is estimated, the SLAM executor 123 updates the location of the mobile robot using a measurement system function indicated by Equation 3 based on the captured second image.

$$Z = h \cdot (X_K) + Q_S$$ [Equation 3]

$$z = \begin{bmatrix} \gamma_1 \\ \theta_1 \\ \gamma_2 \\ \theta_2 \\ \vdots \end{bmatrix}$$

The measurement system function is constructed by a Z vector obtained by using a predicted state vector $X_k$, an error covariance $Q_S$ considering an error of a sensor measurement value, and feature points of the second image. Thus, the location of the mobile robot and the locations (map) of feature points are updated.

Figure 7:
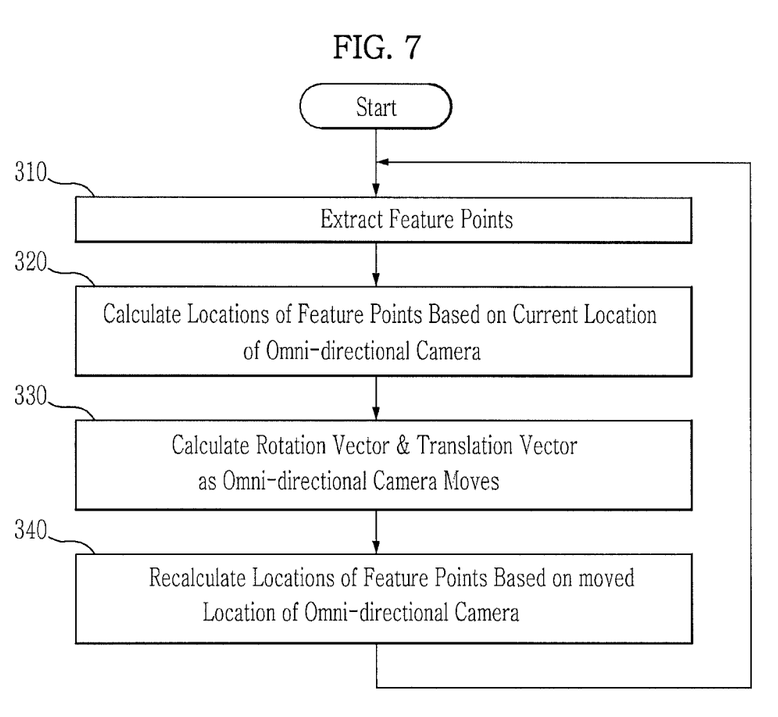
FIG. 7 is a flowchart illustrating a method to calculate visual odometry information in FIG. 4.
Figure 8:
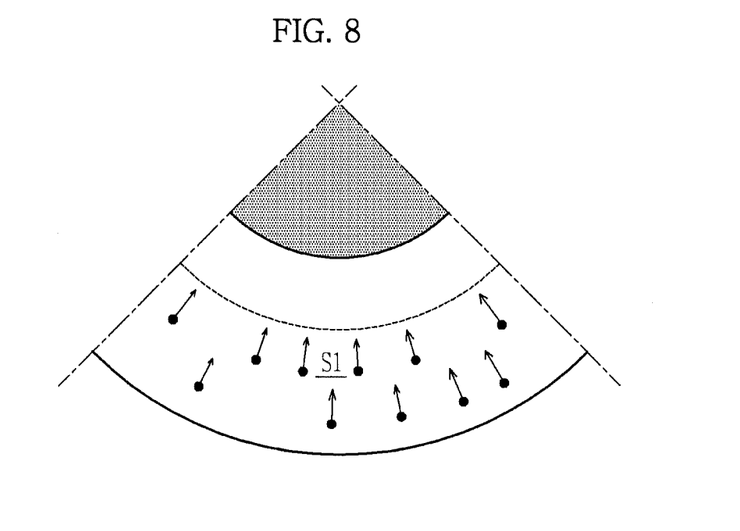
FIG. 8 is a diagram illustrating extraction of feature points.
Figure 9:
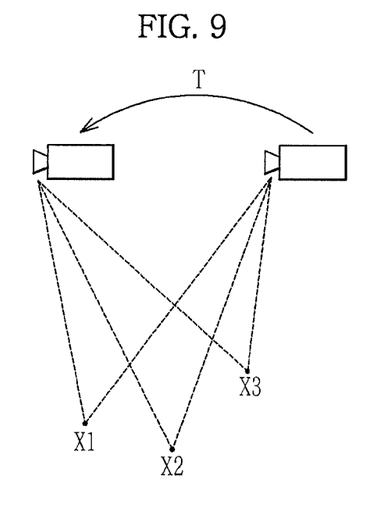
FIG. 9 is a diagram illustrating location estimation of locations of feature points as a mobile robot moves.

FIG. 7 is a flowchart illustrating a method to calculate visual odometry information in FIG. 4, FIG. 8 is a diagram illustrating extraction of feature points, and FIG. 9 is a diagram illustrating location estimation of feature points as a mobile robot moves.

Referring to FIG. 7, the visual odometry calculator 122 repeats a process to extract feature points, calculate a motion transform vector of an omni-directional camera, and track locations of the feature points according to the movement of the omni-directional camera.

Specifically, the visual odometry calculator 122 periodically extracts feature points from a first image which is a bottom surface image in step 310. Meanwhile, new feature points are extracted from an area (an upper area of dotted lines) excluding an area (a lower area of dotted lines) in which the location-tracked feature points are present as shown in FIG. 8.

If the feature points are extracted in step 310, the visual odometry calculator 122 calculates 3-dimensional location coordinates (X,Y,Z) of the feature points extracted from a current location of the omni-directional camera in step 320.

The visual odometry calculator 122 calculates a rotation vector and a translation vector according to variation in a location of the omni-directional camera as the mobile robot moves in step 330. Step 330 involves calculating a transform vector between a location of the omni-directional camera at $t_k$ and a location of the omni-directional camera at $t_{k+1}$. The transform vector may be calculated using an optimization scheme of a Singular Value Decomposition (SVD) or a least square method.

Referring to FIG. 9, if a transform vector (T) constructed by a rotation vector and a translation vector is calculated, the visual odometry calculator 122 predicts 3-dimensional location coordinates of feature points $x_1, x_2, x_3$ . . . based on a moved location of the omni-directional camera (location of the omni-directional camera at $t_{k+1}$) in step 340. Thus, locations of the feature points $x_1, x_2, x_3$ . . . may be tracked.

A method to predict the 3-dimensional location coordinates of feature points based on the moved omni-directional camera is indicated by Equation 4.

$$^{\{tk+1\}}x_i = ^{\{tk+1\}}T_{\{tk\}} * ^{\{tk\}}x_i \qquad \text{[Equation 4]}$$

where $^{\{tk+1\}}X_i$ denotes an estimated location of a feature point at $t_{k+1}$, $^{\{tk+1\}}T_{\{tk\}}$ denotes transform vector [R|T], and $^{\{tk\}}x_i$ denotes a location of a feature point at $t_k$.

As is apparent from the above description, since the odometry information is calculated using a bottom surface photographed according to a traveling path of a mobile robot, accurate odometry information may be provided irrespective of the state of the bottom surface and thus the performance of simultaneous localization and map building may be improved.

The embodiments can be implemented in computing hardware and/or software, such as (in a non-limiting example) any computer that can store, retrieve, process and/or output data and/or communicate with other computers. For example, a computer processor can be used to perform various calculations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A simultaneous localization and map building method of a mobile robot including an omni-directional camera, comprising:

acquiring an omni-directional image from the omni-directional camera;

dividing the acquired omni-directional image according to a preset reference to generate a lower image and an upper image;

extracting feature points from the lower image and calculating visual odometry information to track locations of the extracted feature points based on a location of the omni-directional camera, the location of the omni-directional camera determined based on rotational and translational vectors derived from only the lower image; and performing localization and map building of the mobile robot using the calculated visual odometry information and the upper image as an input of an extended Kalman filter, wherein at least one of said dividing, said extracting, said calculating and said performing are performed by a computer.

2. The simultaneous localization and map building method of claim 1, wherein the omni-directional camera is installed in parallel to a horizontal plane at a front surface of the mobile robot.

3. The simultaneous localization and map building method of claim 1, wherein said calculating visual odometry information includes:

calculating locations of the extracted feature points based on a current location of the omni-directional camera;

calculating a rotation vector and a translation vector according to movement of the omni-directional camera; and tracking locations of the extracted feature points by calculating locations of the extracted feature points based on a moved location of the omni-directional camera according to the calculated rotation vector and translation vector.

4. The simultaneous localization and map building method of claim 3, wherein said extracting feature points from the lower image includes extracting new feature points from an area of the lower image excluding an area in which the location-tracked feature points are present.

5. The simultaneous localization and map building method of claim 1, wherein the preset reference is a height of the omni-directional camera based on the ground.

6. The simultaneous localization and map building method of claim 1, wherein said performing localization and map building of the mobile robot includes:

extracting feature points from the upper image;

predicting locations of the robot and the extracted feature points of the upper image using the calculated visual odometry information as a traveling input; and updating the locations of the robot and the extracted feature points of the upper image by updating the locations of the robot and the extracted feature points of the upper image based on the upper image.

7. A mobile robot including an omni-directional camera, comprising:

an image processor to divide an omni-directional image captured through the omni-directional camera according to a preset reference to generate a lower image and an upper image;

a visual odometry information calculator to extract feature points from the lower image and track locations of the extracted feature points based on a location of the omni-directional camera, the location of the omni-directional camera determined based on rotational and translational vectors derived from only the lower image; and a simultaneous location and map building (SLAM) executor to perform localization and map building of the mobile robot using visual odometry information calculated by the visual odometry information calculator and the upper image as an input of an extended Kalman filter.

8. The mobile robot of claim 7, wherein the omni-directional camera is installed in parallel to a horizontal plane at a front surface of the mobile robot.

9. The mobile robot of claim 7, wherein the visual odometry information calculator:
calculates locations of the extracted feature points based on a current location of the omni-directional camera;
calculates a rotation vector and a translation vector according to movement of the omni-directional camera; and
tracking the locations of the extracted feature points by recalculating the locations of the extracted feature points based on a moved location of the omni-directional camera according to the calculated rotation vector and translation vector.

10. The mobile robot of claim 9, wherein the visual odometry information calculator extracts new feature points from an area of the lower image excluding an area in which the location-tracked feature points are present.

11. The mobile robot of claim 7, wherein the image processor divides the captured omni-directional image according to the preset reference which is a height of the omni-directional camera based on the ground.

12. The mobile robot of claim 7, wherein the SLAM executor:
extracts feature points from the upper image;
predicts locations of the mobile robot and the extracted feature points of the upper image using the calculated visual odometry information as a traveling input; and
updates the locations of the mobile robot and the extracted feature points of the upper image by updating the locations of the robot and the extracted feature points of the upper image based on the second image.

13. A method comprising:
dividing, by a computer, an omni-directional image acquired from an omni-directional camera of a mobile robot according to a preset reference to generate a lower image and an upper image;
calculating, by a computer, visual odometry information to track locations of feature points extracted from the lower image based on a location of the omni-directional camera, the location of the omni-directional camera determined based on rotational and translational vectors derived from only the lower image; and
performing, by a computer, localization and map building of the mobile robot via an extended Kalman filter using the calculated visual odometry information and the upper image.

14. The method of claim 13, wherein said performing localization and map building of the mobile robot includes:
extracting feature points from the upper image;
predicting locations of the mobile robot and the extracted feature points of the upper image using the calculated visual odometry information as a traveling input; and
updating the locations of the robot and the extracted feature points of the upper image by updating the locations of the robot and the extracted feature points of the upper image based on the upper image.

* * * * *